United States Patent [19]
Yoshida

[11] Patent Number: 6,028,678
[45] Date of Patent: *Feb. 22, 2000

[54] APPARATUS AND METHOD FOR CLASSIFYING DATA IN ACCORDANCE WITH A SUBADDRESS SIGNAL

[75] Inventor: Takehiro Yoshida, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/915,319

[22] Filed: Aug. 20, 1997

Related U.S. Application Data

[62] Division of application No. 08/873,713, Jun. 12, 1997, which is a continuation of application No. 08/351,648, Dec. 7, 1994, abandoned.

[30] Foreign Application Priority Data

Dec. 10, 1993 [JP] Japan .................................. 5-341273

[51] Int. Cl.[7] .................................................... H04N 1/44
[52] U.S. Cl. ........................... 358/405; 358/440; 358/467
[58] Field of Search ..................................... 358/404, 405, 358/406, 434–436, 438–440, 468, 444, 467; 380/18; H04N 1/00, 1/21, 1/44

[56] References Cited

U.S. PATENT DOCUMENTS

| | | | |
|---|---|---|---|
| 4,907,094 | 3/1990 | Mishima et al. ......................... | 358/437 |
| 4,952,972 | 8/1990 | Someya .................................... | 358/475 |
| 5,057,941 | 10/1991 | Moriya .................................... | 358/440 |
| 5,075,783 | 12/1991 | Yoshida et al. .......................... | 358/439 |
| 5,126,850 | 6/1992 | Kato ........................................ | 358/406 |
| 5,155,601 | 10/1992 | Toyama .................................... | 358/405 |
| 5,155,602 | 10/1992 | Terajima .................................. | 358/440 |
| 5,177,620 | 1/1993 | Fukushima .............................. | 358/468 |
| 5,208,681 | 5/1993 | Yoshida .................................... | 358/404 |
| 5,216,520 | 6/1993 | Omura et al. ............................ | 358/468 |
| 5,227,894 | 7/1993 | Yoshida .................................... | 358/441 |
| 5,237,428 | 8/1993 | Tajitsu et al. ............................ | 358/437 |
| 5,386,303 | 1/1995 | Kihara ....................................... | 358/405 |
| 5,481,374 | 1/1996 | Tachibana et al. ...................... | 358/404 |
| 5,483,353 | 1/1996 | Kudou ...................................... | 358/404 |
| 5,508,819 | 4/1996 | Yanagisawa ............................. | 358/404 |
| 5,510,907 | 4/1996 | Koichi ..................................... | 358/440 |
| 5,561,533 | 10/1996 | Yoshida .................................... | 358/440 |
| 5,640,250 | 6/1997 | Yoshida .................................... | 358/468 |
| 5,682,246 | 10/1997 | Yoshida .................................... | 358/438 |
| 5,742,402 | 4/1998 | Kobayashi et al. ...................... | 358/404 |
| 5,808,753 | 9/1998 | Yoshida .................................... | 358/440 |

FOREIGN PATENT DOCUMENTS 2-113768  4/1990  Japan .

*Primary Examiner*—Kim Yen Vu
*Attorney, Agent, or Firm*—Fitzpatrick, Cella, Harper & Scinto

[57] ABSTRACT

There is provided a facsimile apparatus having a heat fixing unit, in which received information stored in a memory and corresponding to a plurality of communication cycles is output at once, thereby reducing power consumption.

A facsimile apparatus includes a memory circuit for storing received information, a heat fixing recorder circuit for recording the received information, a memory circuit (number of sheets for record start) for storing the number of sheets in advance, and a controller for controlling these circuits. The fixing unit is in an OFF state during waiting. The controller turns on the heat fixing recorder circuits to record the received information when the received information stored in the memory circuit reaches the number of sheets stored in the memory circuit (number of sheets for record start).

4 Claims, 17 Drawing Sheets

APPARATUS AND METHOD FOR CLASSIFYING DATA IN ACCORDANCE WITH A SUBADDRESS SIGNAL

This application is a division of application Ser. No. 08/873,713, filed Jun. 12, 1997, which is a continuation of application Ser. No. 08/351,648 filed Dec. 7, 1994.

BACKGROUND OF THE INVENTION

1. Field of the Invention

The present invention relates to a facsimile apparatus and, more particularly, to a facsimile apparatus which records received information stored in a memory all together.

2. Related Background Art

In a conventional facsimile apparatus, received information is basically immediately recorded such that the information is simultaneously recorded with start of reception, or the information is recorded upon completion of reception of one page. That is, the facsimile apparatus has instantaneity as its primary importance.

There has been proposed a facsimile apparatus in which image data received at night when no operator is present is stored in a memory and recorded not at that time but in the morning. Also in this facsimile apparatus, image data received during daytime is recorded in real time.

In the conventional facsimile apparatus, received information is basically immediately recorded, so that instantaneity is sufficiently ensured.

In such a facsimile apparatus, however, power saving cannot be effectively achieved. For example, there is a facsimile apparatus which performs surf (Surface Rapid Fusing)-fixing recording (a fixing unit is not normally supplied with power but energized at the time of recording) suitable for power saving. Even in this facsimile apparatus, if information corresponding to one page is received every 20 minutes, preheat for recording is performed every 20 minutes. Upon completion of recording of one page, preheat is canceled.

Surf-fixing recording will be briefly described. Most of conventional facsimile apparatuses employ a heat roller fixing unit constituted by a fixing roller having a large heat capacity and a halogen lamp arranged in the fixing roller. In surf-fixing recording, in place of these components, a thin fixing film and a heater having a small heat capacity pressed against the fixing film are used. With this arrangement, preheat of the heater during waiting becomes unnecessary, thereby achieving power saving. This is because a time for preheat from the room temperature to a recording allowable temperature is decreased as compared to the conventional heat roller fixing unit. More specifically, in surf-fixing, the time for preheat from the room temperature to the recording allowable temperature is as short as about six seconds. Therefore, if a record state can be set within this time period, preheat of the heater during waiting is not needed. As described above, surf-fixing recording is effectively used as a recording means because power can be saved during waiting. However, in the above-described recording of received information, preheat is performed before recording of one page, and thereafter, the information corresponding to one page is recorded. In addition, the temperature of the heater is decreased in 20 minutes. Before recording of the next page, the heater must be preheated again. For this reason, preheat for real-time recording is performed every time information is received.

SUMMARY OF THE INVENTION

It is an object of the present invention to improve a facsimile apparatus.

It is another object of the present invention to provide a facsimile apparatus which saves power necessary for outputting received information stored in a memory.

DETAILED DESCRIPTION OF THE PREFERRED EMBODIMENTS

The present invention will be described below in detail on the basis of embodiments shown in the accompanying drawings.

First Embodiment

Figures 1, 1A:
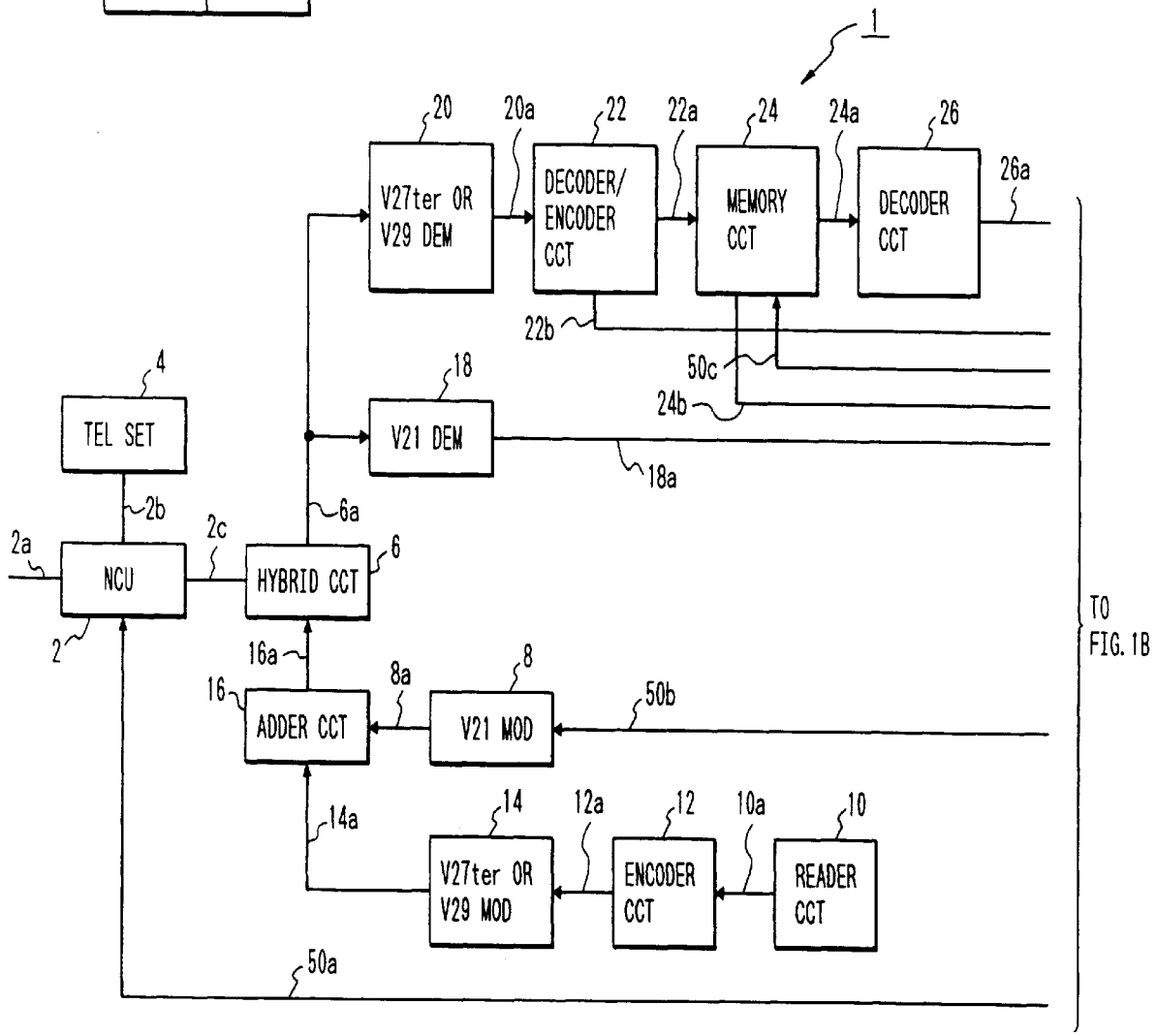
FIG. 1 is comprised of FIGS. 1A and 1B and it is a block diagram showing the arrangement of a facsimile apparatus according to the first embodiment of the present invention.
Figure 1B:
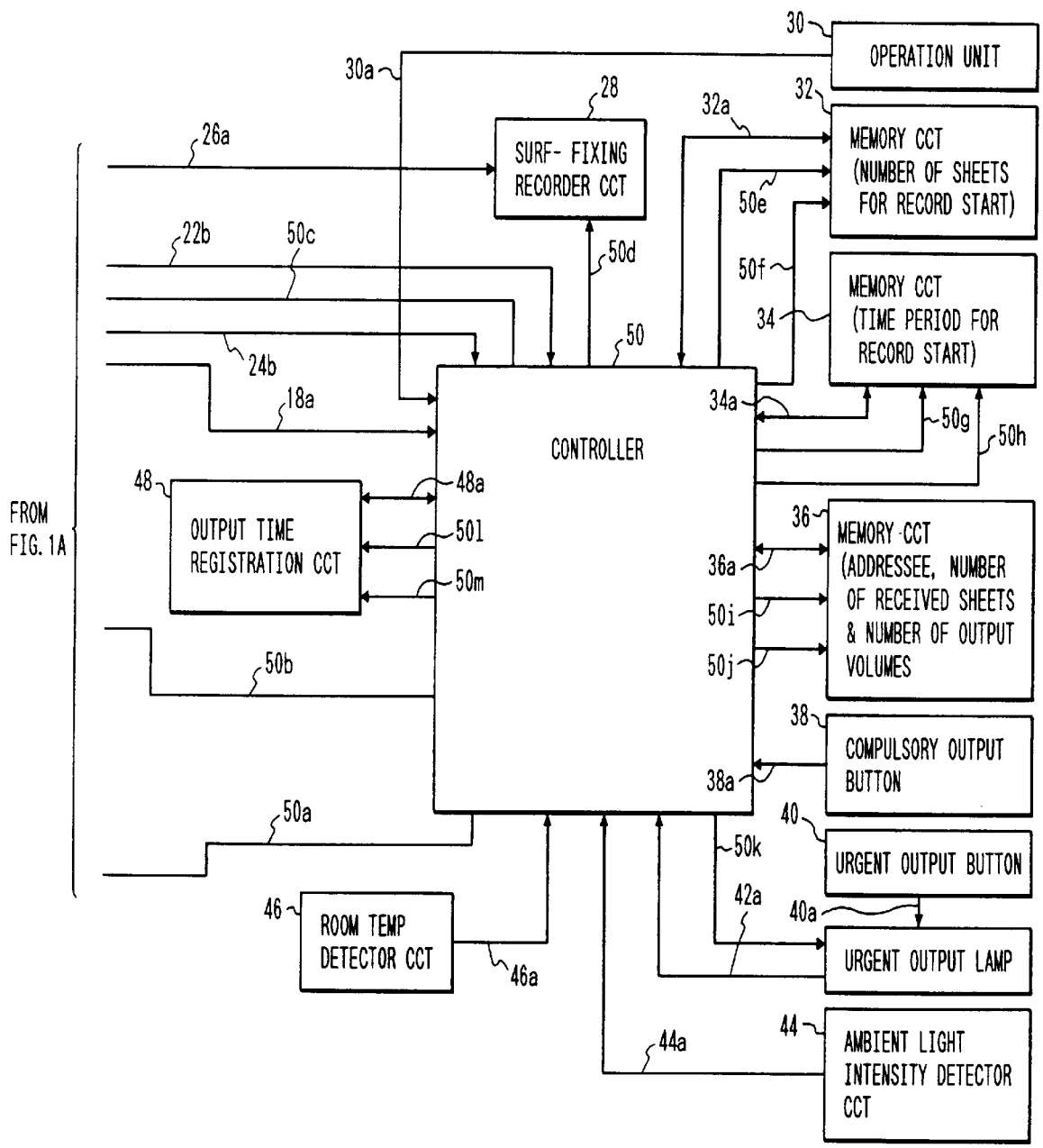

FIGS. 1A and 1B show block diagrams illustrating the arrangement of a facsimile apparatus according to the first embodiment of the present invention. The arrangement of each portion of a facsimile apparatus 1 of this embodiment will be described below. An NCU (Network Control Unit) 2 is connected to a terminal of a telephone line to use a telephone network for, e.g., data communications, executes connection control of a telephone switching network, performs switching to a data communication path, and holds a loop. A signal line 2a connected to the NCU 2 serves as a telephone line. Upon reception of a signal on a signal line 50a, if the signal level of the signal is "0", the NCU 2 connects the telephone line to a telephone set 4, i.e., connects the signal line 2a to a signal line 2b. When the signal level of a signal on the signal line 50a is "1", the NCU 2 connects the telephone line to the facsimile apparatus, i.e., connects the signal line 2a to a signal line 2c. In a normal state, the telephone line is connected to the telephone set side.

A hybrid circuit 6 for separating transmission-system signals and reception-system signals is connected to the NCU 2 through the signal line 2c. A transmission signal on a signal line 16a is sent onto the telephone line via the signal line 2c and the NCU 2. A signal sent from a partner station through the signal line 2a serving as a telephone line is output to a signal line 6a via the NCU 2 and the signal line 2c.

A modulator 8 performs modulation based on the CCITT (International Telegraph and Telephone Consultative Committee) recommendation V21. The modulator 8 receives and modulates a protocol signal on a signal line 50b, and outputs the modulated data onto a signal line 8a.

A reader circuit 10 is constituted by an image pickup element such as a CCD (Charge-Coupled Device), and an optical system. The reader circuit 10 sequentially reads image signals for one main scan line from a transmission original, and generates a signal train representing two values, i.e., black and white. The signal train of the binary data of black and white is output onto a signal line 10a.

An encoder circuit 12 receives read data output onto the signal line 10a and outputs the data which is encoded (by MH (Modified Huffman) or MR (Modified READ) encoding) onto a signal line 12a.

A modulator 14 performs modulation based on the CCITT recommendation V27ter (differential phase modulation) or V29 (quadrature modulation). The modulator 14 receives and modulates a signal on the signal line 12a and outputs the modulated data onto a signal line 14a.

An adder circuit 16 receives signals from the signal lines 8a and 14a and outputs the sum data onto a signal line 16a.

A demodulator 18 performs demodulation based on the CCITT recommendation V21. The demodulator 18 receives and demodulates a signal from the signal line 6a, performs demodulation based on the V21, and outputs the demodulated data onto a signal line 18a.

A demodulator 20 performs demodulation based on the CCITT recommendation V27ter (differential phase modulation) or V29 (quadrature modulation). The demodulator 20 receives and demodulates a signal on the signal line 6a and outputs the demodulated data onto a signal line 20a.

A decoder/encoder circuit 22 receives and temporarily decodes data output onto the signal line 20a and outputs the decoded data onto a signal line 22b. At the same time, this data is encoded by MR (Modified READ) encoding with k=8 and output onto a signal line 22a.

A memory circuit 24 stores the demodulated data output onto the signal line 22a in accordance with a control signal on a signal line 50c. The memory circuit 24 also outputs the data stored in accordance with the control signal on the signal line 50c onto a signal line 24a. The memory circuit 24 also outputs the usable empty area onto a signal line 24b in units of Kbytes. A decoder circuit 26 receives a signal output onto the signal line 24a and outputs the data decoded (by MH (Modified Huffman) decoding or MR (Modified READ) decoding) onto a signal line 26a.

A surf-fixing recorder circuit (LBP) 28 receives a signal on a signal line 50d. If the signal level is "0", a waiting state is set. If the signal level is "1", preheat for recording is performed. If the signal level is "2", data output onto the signal line 26a is received to sequentially perform surf-fixing recording of one line.

An operation unit (or console unit) 30 includes a start key, a ten-key pad, a one-touch dialing key, an abbreviated dialing key, a registration key (number of sheets for record start), a registration key (time period for record start even with a short number of sheets), and an output time registration key. The operation unit 30 outputs information corresponding to a depressed key onto a signal line 30a.

A memory circuit (number of sheets for record start) 32 registers the number of sheets as predetermined. When the received information stored in the memory circuit 24 exceeds the number of sheets registered in the memory circuit (number of sheets for record start) 32, recording is started. When the number of sheets is to be stored in the memory circuit (number of sheets for record start) 32, a controller 50 outputs the number of sheets (e.g., 50) onto a signal line 32a, and thereafter, supplies a write pulse onto a signal line 50e. When the number of sheets stored in the memory circuit (number of sheets for record start) 32 is to be read out, the controller 50 supplies a read pulse onto a signal line 50f. Upon reception of the read pulse from the controller 50, the memory circuit (number of sheets for record start) 32 outputs the stored number of sheets (e.g., 50) onto the signal line 32a.

A memory circuit (time period for record start) 34 stores a time period as predetermined. If received information exceeding the number of sheets is not stored in the memory circuit 24, recording is started after the elapse of a predetermined time period from the latest recording. When a time period is to be stored in the memory circuit (time period for record start) 34, the controller 50 outputs a time period (e.g., 120 minutes) onto a signal line 34a, and thereafter, supplies a write pulse onto a signal line 50g. When the time period stored in the memory circuit (time period for record start) 34 is to be read out, the controller 50 supplies a read pulse onto a signal line 50h. Upon reception of the read pulse from the controller 50, the memory circuit (time period for record start) 34 outputs the stored time period (e.g., 120 minutes) onto the signal line 34a.

A memory circuit (addressee, number of received sheets, and number of output volumes) 36 stores an addressee, the number of received sheets, and the number of output volumes in correspondence with the communication number of received information stored in the memory circuit 24. When an addressee, the number of received sheets, and the number of output volumes are to be stored in the memory circuit (addressee, number of received sheets, and number of output volumes) 36, the controller 50 outputs the following protocol signal, i.e., a character signal represented by, e.g., a communication number (e.g., 1223), a space, an addressee on a receiver station side (e.g., 25H as a sub-address corresponding to FFH from 00H), a space, the number of received sheets (e.g., 11), a space, and the number of output volumes (e.g., 1) in the order named onto a signal line 36a, and supplies a write pulse onto a signal line 50i. When information stored in the memory circuit (addressee, number of received sheets, and number of output volumes) 36 is to be read out, the controller 50 outputs the communication number (e.g., 1223) onto the signal line 36*a*, and thereafter, supplies a read pulse onto a signal line 50*j*. The memory circuit (addressee, number of received sheets, and number of volumes) 36 outputs the information stored in correspondence with the communication number as a character signal represented by, e.g., the addressee on the receiver station side (e.g., sub-address 25H), a space, the number of received sheets (e.g., 11), a space, and the number of output volumes (e.g., 1) in the order named onto the signal line 36*a*.

A compulsory output button 38 is depressed to forcibly record received information stored in the memory circuit 24. When the compulsory output button 38 is depressed, a pulse is generated onto a signal line 38*a*.

An urgent output button 40 is depressed to immediately output to-be-transmitted information on the receiver side. When the urgent output button 40 is depressed, a pulse is supplied onto a signal line 40*a*.

An urgent output lamp 42 is turned on in transmission assuming that to-be-transmitted information is immediately output. When a clear pulse is supplied onto a signal line 50*k*, the urgent output lamp 42 is turned off. Every time a pulse is supplied onto the signal line 40*a*, the urgent output lamp 42 is repeatedly turned on and off. The urgent output lamp 42 outputs a signal of level "0" onto a signal line 42*a* upon turning off, and a signal of level "1" onto the signal line 42*a* upon turning on.

An ambient light intensity detector circuit 44 detects an ambient light intensity near the facsimile apparatus 1. In outputting a signal according to the ambient light intensity onto a signal line 44*a*, the ambient light intensity detector circuit 44 outputs a signal of level "1" at the highest light intensity and a signal of level "0" at the lowest light intensity. At an intermediate light intensity, an analog value from "0" to "1" is output. A room temperature detector circuit 46 detects a room temperature near the facsimile apparatus 1. The room temperature detector circuit 46 outputs temperature information onto a signal line 46*a*.

An output time registration circuit 48 registers a time for outputting received information. When a time is to be registered in the output time registration circuit 48, the controller 50 outputs a character signal represented by a time (e.g., 8:00), a space, a time (e.g., 10:00), a space, a time (e.g., 12:00), a space, a time (e.g., 14:00), a space, a time (e.g., 16:00), a space, a time (e.g., 18:00), a space, and a time (e.g., 20:00) in the order named onto a signal line 48*a*, and thereafter, supplies a write pulse onto a signal line 50*l*. When a plurality of times registered in the output time registration circuit 48 are to be read out, a read pulse is supplied onto a signal line 50*m*. Upon reception of the read pulse from the controller 50, the output time registration circuit 48 outputs a protocol signal represented by 8:00, a space, 10:00, a space, 12:00, a space, 14:00, a space, 16:00, a space, 18:00, a space, and 20:00 onto the signal line 48*a* as time information registered in the output time registration circuit 48.

The controller 50 has a function of storing received information in the memory circuit 24 and subsequently stores received information in the memory circuit 24. When received information exceeding the number of sheets is stored in the memory 24, the controller 50 controls to record the received information at once. The number of sheets is registered in the memory circuit (number of sheets for record start) 32 by the operation unit 30.

Figure 2:
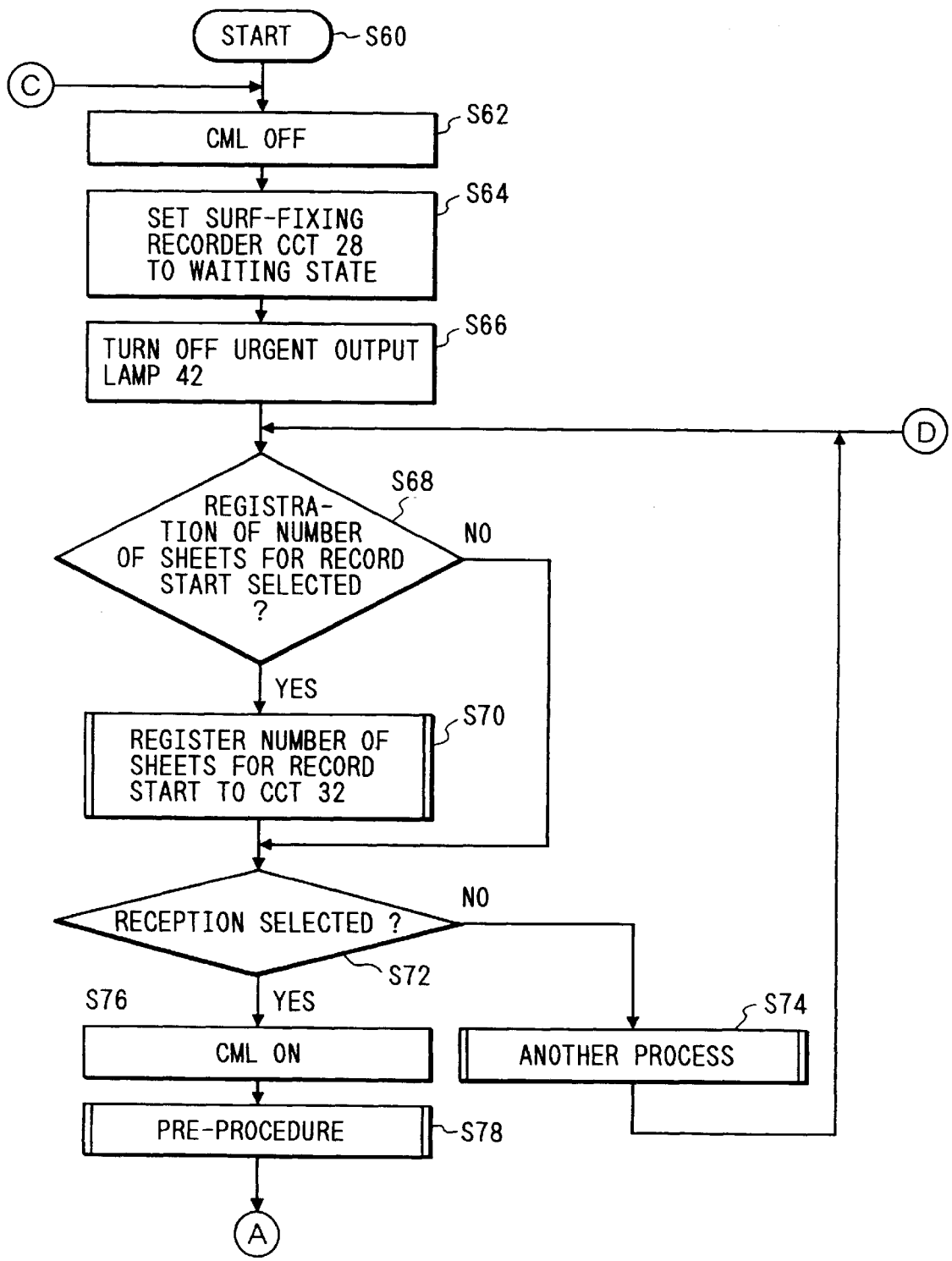
FIG. 2 is a flow chart showing facsimile transmission/reception control executed by a controller 50.
Figure 3:
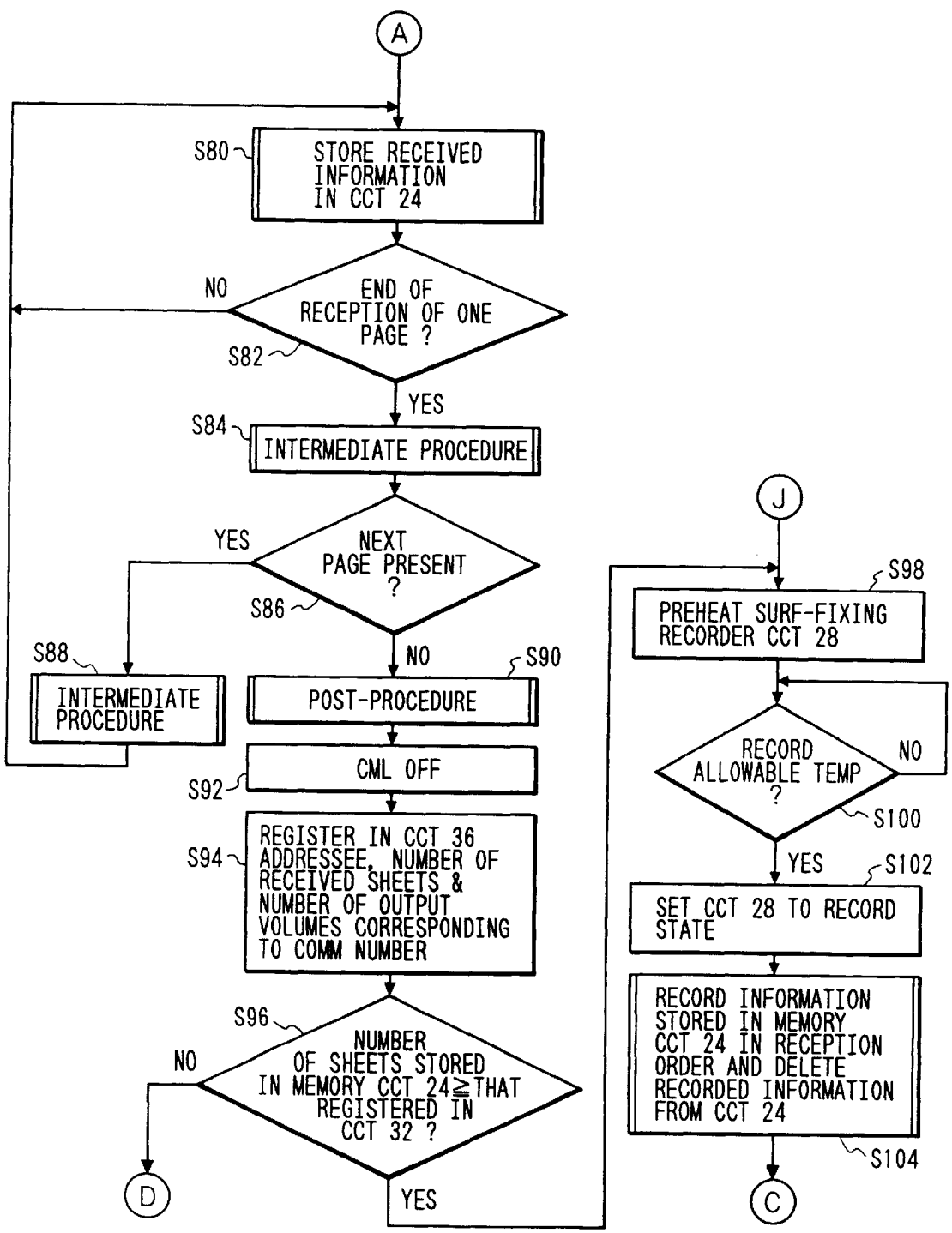
FIG. 3 is a flow chart showing facsimile transmission/reception control executed by the controller 50.

FIGS. 2 and 3 are flow charts showing a facsimile transmission/reception control routine executed by the controller 50.

The controller 50 outputs a signal of level "0" onto the signal line 50*a* to turn off a CML serving as a relay in the NCU 2 (step S62). A signal of level "0" is output onto the signal line 50*d* to set the surf-fixing recorder circuit 28 to the waiting state (step S64). A clear pulse is generated onto the signal line 50*k* to turn off the urgent output lamp 42 (step S66). It is determined whether registration of the number of sheets for record start of image data stored in the memory circuit 24 is selected by the operation unit 30 (step S68). If YES in step S68, the flow advances to step S70 to register the number of sheets for record start in the memory circuit (number of sheets for record start) 32; otherwise, the flow advances to step S72.

In step S72, it is determined whether reception is selected. If YES in step S72, a signal of level "1" is output onto the signal line 50*a* to turn on the CML; otherwise, another process is executed (step S74).

The controller 50 performs a pre-procedure to store received information in the memory circuit 24 (step S78).

The controller 50 outputs a command through the signal line 50*c* to store the received information in the memory circuit 24 (step S80).

The controller 50 determines whether reception of one page is ended (step S82). If YES in step S82, the controller 50 continuously performs an intermediate procedure to store the received information in the memory circuit 24 (step S84).

The controller 50 determines whether the next page is present (step S86). If YES in step S86, the intermediate procedure is executed (step S88), and the flow returns to step S80; otherwise, the flow advances to step S90 to execute a post-procedure.

The controller 50 outputs a signal of level "0" onto the signal line 50*a* to turn off the CML (step S92). The controller 50 registers in the memory circuit (addressee, number of received sheets, and number of output volumes) 36 an addressee, the number of received sheets, and the number of output volumes corresponding to the communication number (step S94).

It is determined whether the number of sheets of the received information stored in the memory circuit 24 exceeds that registered in the memory circuit (number of sheets for record start) 32 (step S96). If YES in step S96, a signal of level "1" is output onto the signal line 50*d* to preheat the surf-fixing recorder circuit 28 (step S98).

The surf-fixing recorder circuit 28 is preheated in step S98, and it is determined whether a record allowable temperature is set (step S100). If YES in step S100, a signal of level "2" is output onto the signal line 50*d* to set the surf-fixing recorder circuit 28 to a record state (step S102).

The controller 50 outputs a control signal via the signal line 50*c* to record the received information stored in the memory circuit 24 in the reception order (step S104). The recorded information is deleted from the memory circuit 24.

Second Embodiment

A facsimile apparatus of the second embodiment will be described below. The facsimile apparatus of the second embodiment has the same arrangement as that of the first embodiment. In the facsimile apparatus 1 of the first embodiment, it is determined whether the number of sheets of the received information stored in the memory circuit 24 exceeds the number of sheets for record start every time one communication is ended. In the second embodiment, however, every time received information corresponding to one page is stored in a memory circuit 24, it is determined whether the number of sheets stored in the memory circuit 24 exceeds the number of sheets for record start. If YES, a surf-fixing recorder circuit 28 is preheated. After preheating, recording is started. Reception is continued during recording. Upon completion of reception, all the received information left in the memory circuit 24 is recorded.

Figure 4:
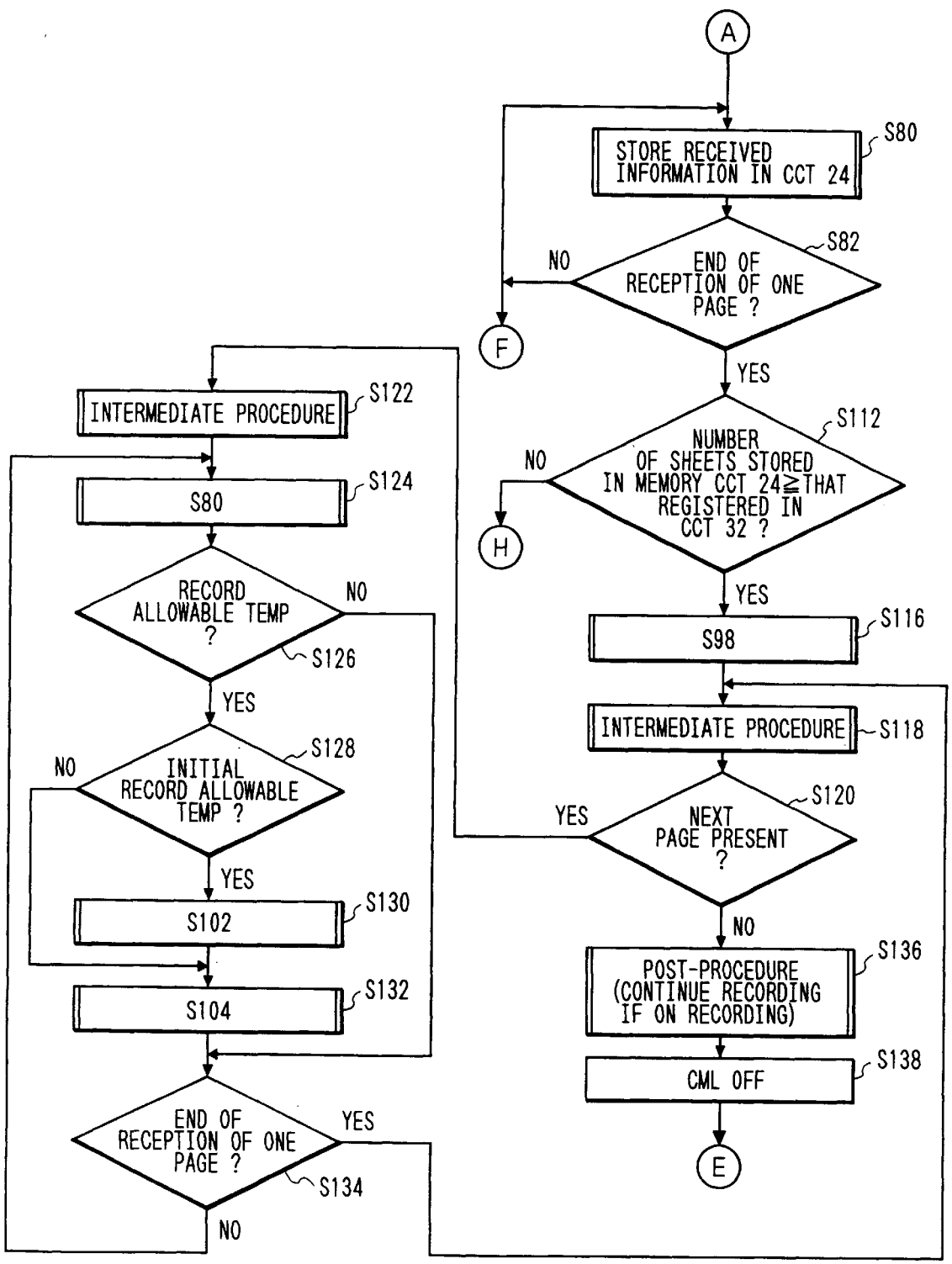
FIG. 4 is a flow chart showing part of a facsimile transmission/reception control routine of the second embodiment.
Figure 5:
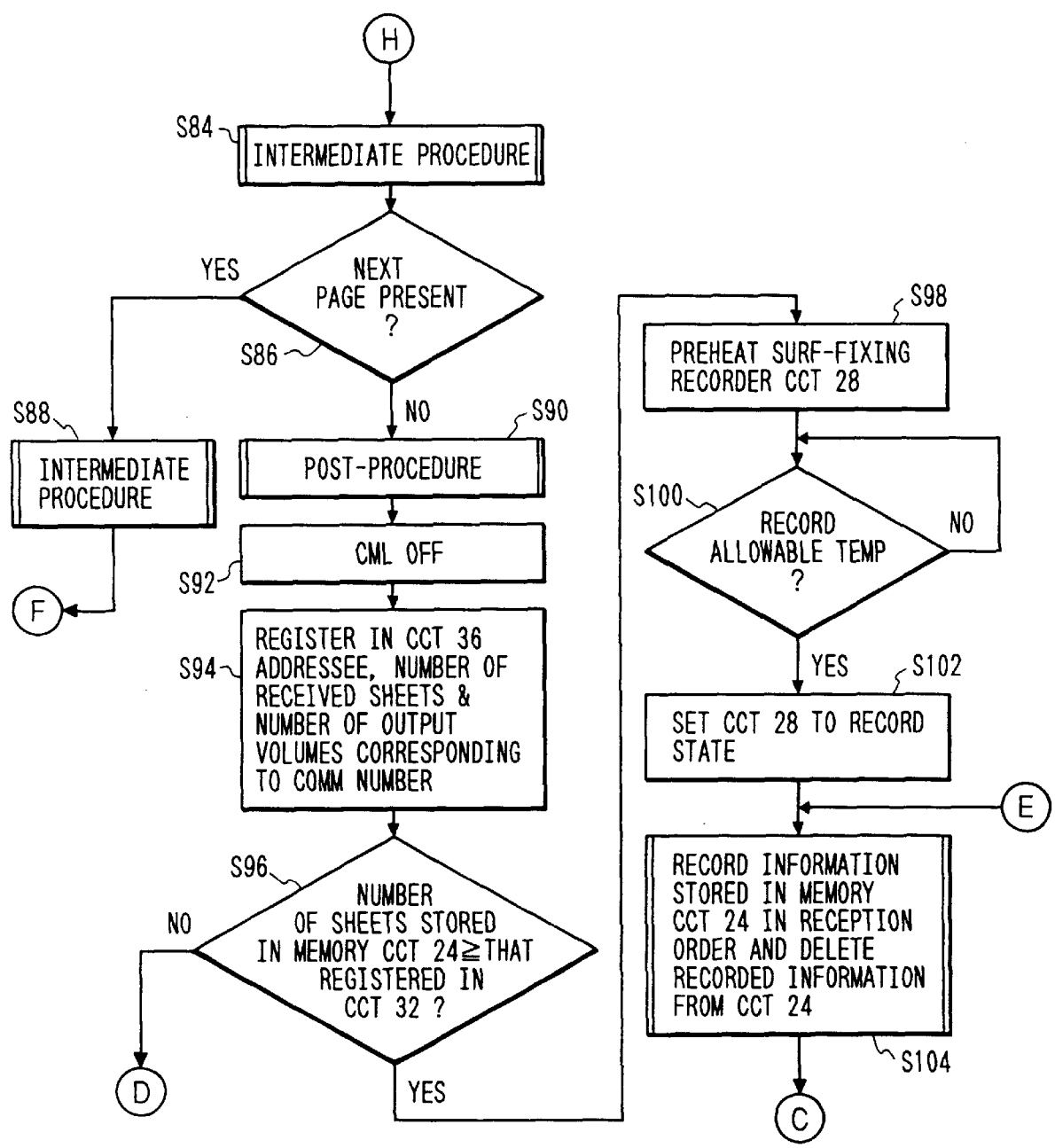
FIG. 5 is a flow chart showing part of the facsimile transmission/reception control routine subsequent to FIG. 4.

FIGS. 4 and 5 are flow charts showing part of a facsimile transmission/reception control routine of the second embodiment. This routine is realized by replacing steps S84 to S102 of the first embodiment with steps S110 to S138 shown in FIG. 4. The same step numbers as those of the first embodiment represent the same processes, and a detailed description thereof will be omitted.

Referring to FIG. 4, if YES in step S82 of the first embodiment, i.e., if information corresponding to one page is received, it is determined whether the number of received sheets stored in the memory circuit 24 exceeds the number of sheets registered in a memory circuit (number of sheets for record start) 32 (step S112). If NO in step S112, the flow advances to step S84 to perform the same process as described in the first embodiment; otherwise, the flow advances to step S116. In step S116, as control with the same content as that in step S98 of the first embodiment, the surf-fixing recorder circuit 28 is preheated. If the surf-fixing recorder circuit 28 is preheated in step S116, an intermediate procedure is performed (step S118). In step S116, recording is continued if on recording.

A controller 50 determines whether the next page is present (step S120). If YES in step S120, an intermediate procedure is executed (step S122). Also at this time, recording is continued if on recording. The controller 50 stores the received information in the memory circuit 24 (step S124).

The controller 50 determines whether a record allowable temperature is set (step S126). If YES, it is determined whether it is an initial record allowable temperature (step S128). If NO in step S126, the flow advances to step S134. If YES in step S128, the surf-fixing recorder circuit 28 is set to a record state (step S130). If NO in step S128, the surf-fixing recorder circuit 28 is already set in the record state, so that the flow advances to step S132. The controller 50 records the received information stored in the memory circuit in the reception order (step S132) and deletes the recorded information from the memory circuit 24. The controller 50 also determines whether reception of one page is ended (step S134). If YES in step S134, the flow returns to step S118; otherwise, the flow returns to step S124.

If NO in step S120, a post-procedure is executed (step S136). At this time, recording is continued if on recording. The controller 50 outputs a signal of level "0" onto a signal line 50a to turn off a CML (step S138). Thereafter, the flow advances to steps from step S104 of the above-described first embodiment.

As described above, in the facsimile transmission/reception control routine of the second embodiment, when the number of received sheets exceeds the number of sheets during communication, the received information can be recorded without waiting completion of communication.

Third Embodiment

A facsimile apparatus of the third embodiment will be described below. The facsimile apparatus of this embodiment has almost the same arrangement as that of the first embodiment, and only different points will be described. In the facsimile apparatus of this embodiment, assume that, when the number of received sheets stored in a memory circuit 24 exceeds the number of sheets for record start, reception for another communication is performed during recording. If the reception of another communication is ended during recording, information received at that time is also simultaneously recorded.

Figure 6:
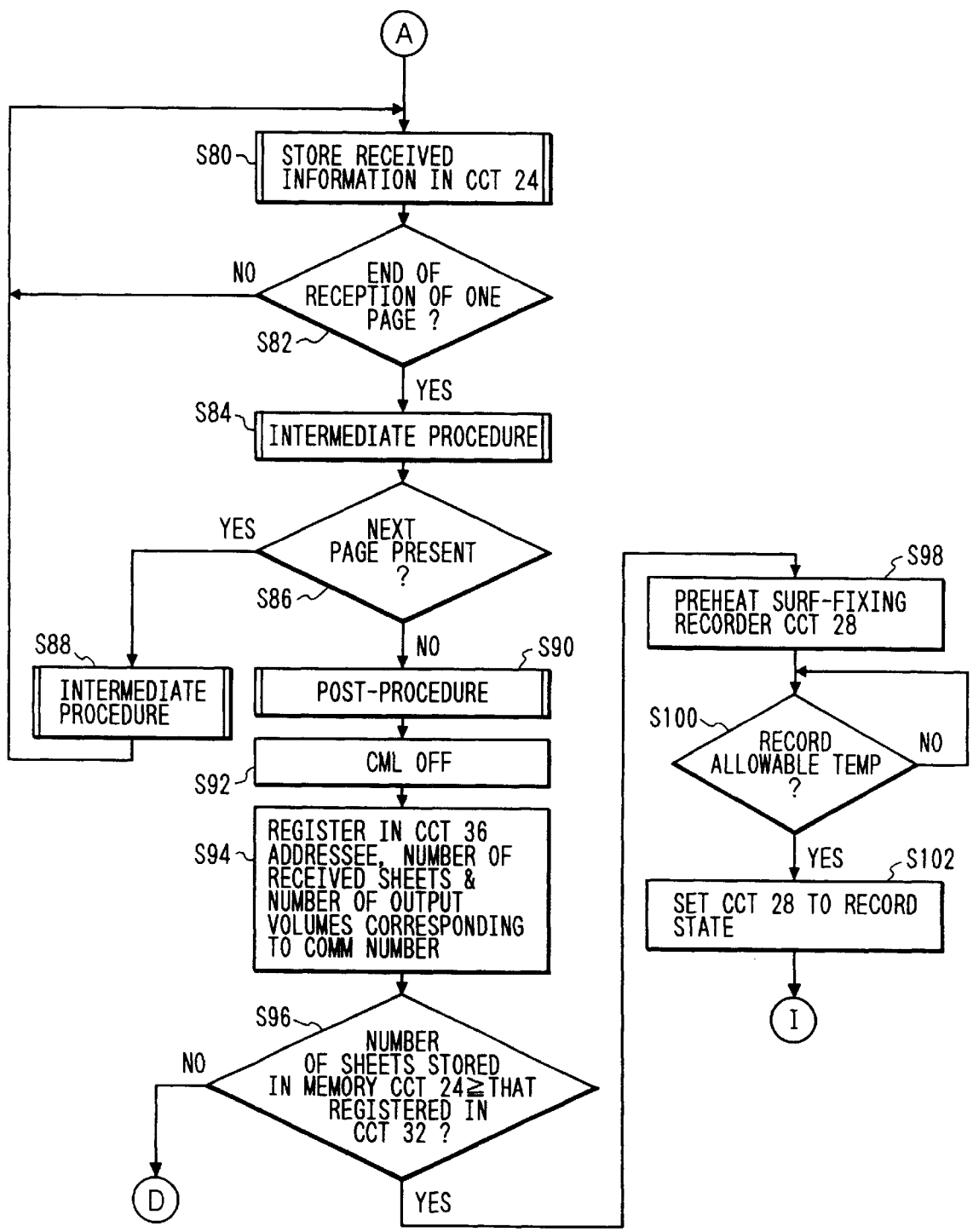
FIG. 6 is a flow chart showing part of a facsimile transmission/reception control routine of the third embodiment.
Figure 7:
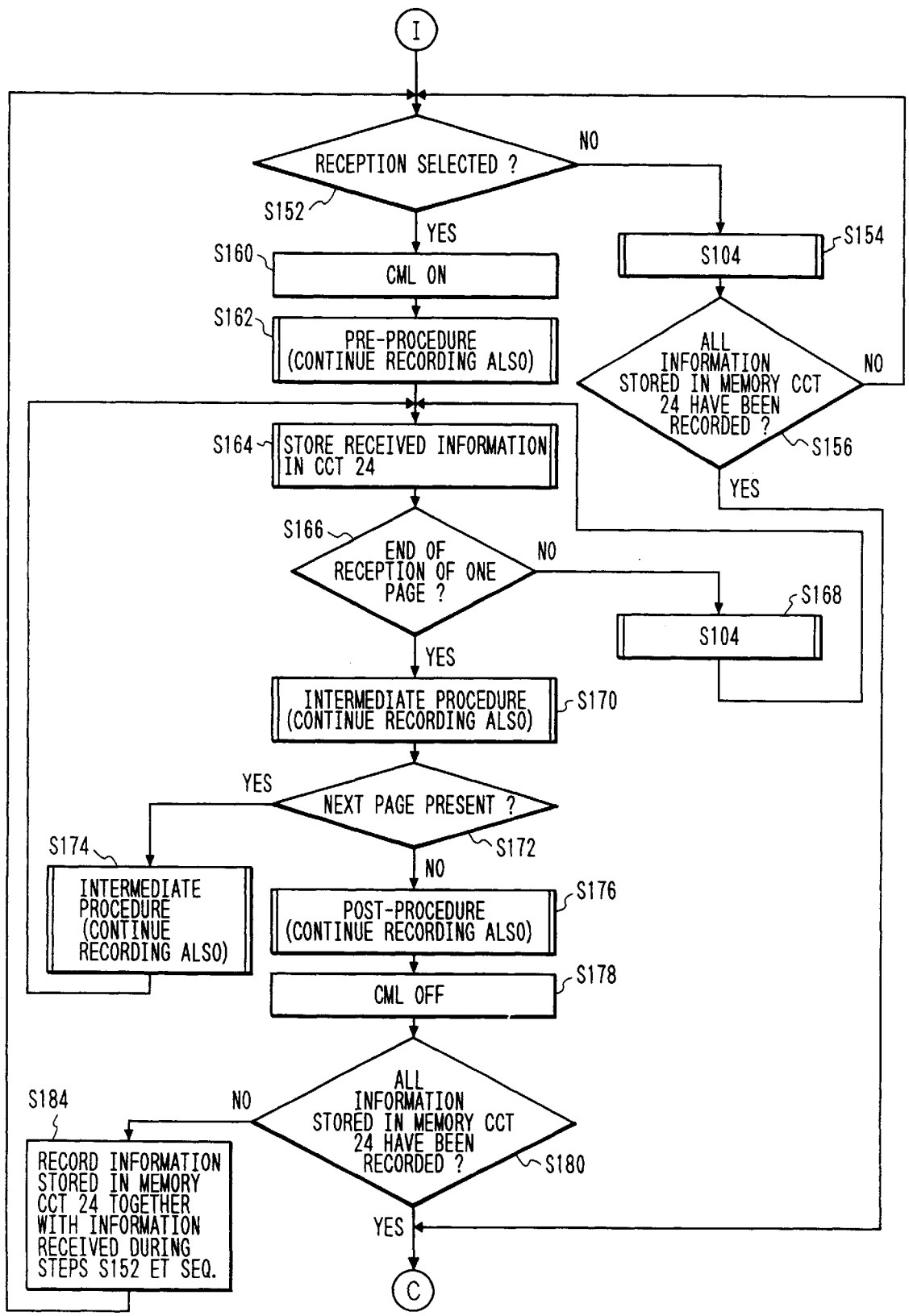
FIG. 7 is a flow chart showing part of the facsimile transmission/reception control routine subsequent to FIG. 6.

FIGS. 6 and 7 are flow charts showing part of a facsimile transmission/reception control routine of the third embodiment. This routine is realized by changing step S104 of the first embodiment. The same step numbers as those of the first embodiment represent the same processes, and a detailed description thereof will be omitted.

A controller 50 determines whether reception is selected (step S152). If NO in step S152, received information stored in the memory circuit 24 is recorded in the reception order, and the recorded information is deleted from the memory circuit 24 (step S154).

It is determined whether all the received information stored in the memory circuit 24 has been recorded (step S156). If YES in step S156, the flow returns to step S62 at the start of this routine. If NO in step S156, the flow returns to step S152.

If YES in step S152, a control signal of level "1" is output onto a signal line 50a to turn on a CML (step S160). A pre-procedure is then executed (step S162). At this time, recording is also continued.

The controller 50 stores the received information in the memory circuit 24 (step S164). In step S166, it is determined whether reception of one page is ended. If NO in step S166, the received information stored in the memory circuit 24 is recorded in the reception order (step S168). The recorded information is deleted from the memory circuit 24.

If YES in step S166, an intermediate procedure is executed (step S170). At this time, recording is also continued.

The controller 50 then determines whether the next page is present (step S172). If YES in step S172, an intermediate procedure is executed (step S174). At this time, recording is also continued. If NO in step S172, a post-procedure is executed (step S176). At this time, recording is also continued. The controller 50 outputs a signal of level "0" onto the signal line 50a to turn off the CML (step S178).

It is determined whether all the received information stored in the memory 24 has been recorded (step S180). If YES in step S180, the flow returns to step S62 at the start of this routine. If NO in step S180, information stored in the memory circuit 24 is recorded together with information received during execution of a routine of steps from step S152 (step S184). Thereafter, the flow returns to step S152 to perform the same process.

According to the facsimile transmission/reception control routine of this embodiment, the information received during recording after the information exceeds the number of sheets during communication can be simultaneously recorded.

Fourth Embodiment

A facsimile apparatus of the fourth embodiment will be described below. In the first embodiment, the received information stored in the memory circuit 24 is read out and recorded when the number of received sheets stored in the memory circuit 24 exceeds the number of sheets for record start. In this embodiment, assume that a plurality of volumes of received information are recorded. In this case, when the number of sheets corresponding to received information stored in a memory circuit 24 exceeds the number of sheets for record start, the received information is read out from the memory circuit 24 and recorded.

Figure 8:
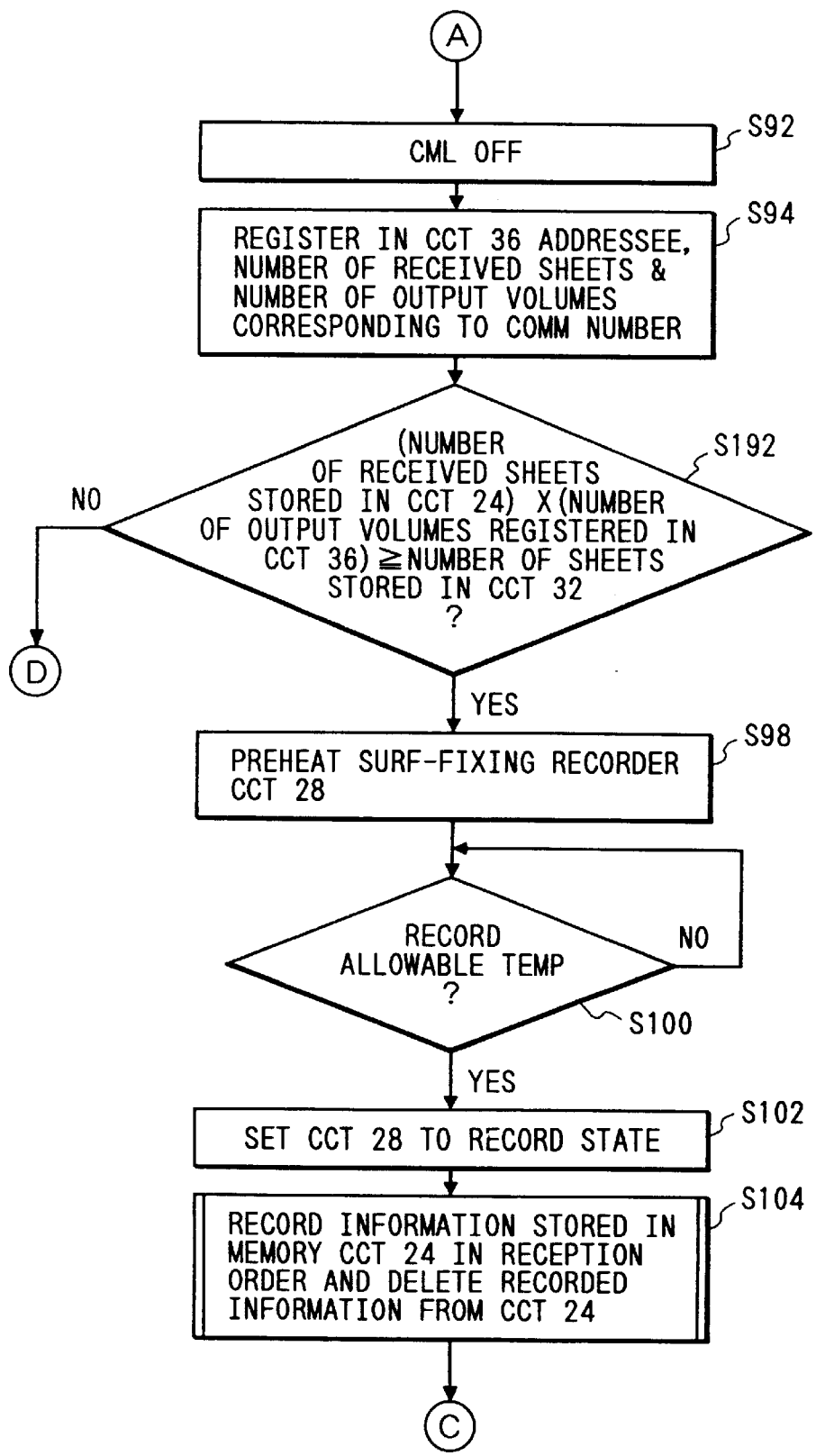
FIG. 8 is a flow chart showing part of a facsimile transmission/reception control routine of the fourth embodiment.

FIG. 8 is a flow chart showing part of a facsimile transmission/reception control routine of the fourth embodiment.

The facsimile transmission/reception control routine of this embodiment is realized by replacing step S96 of the first embodiment with step S192. The same step numbers as those of the first embodiment represent the same control, and a detailed description thereof will be omitted.

A controller 50 determines whether a product of the number of received sheets and the number of output volumes stored in the memory circuit 24 exceeds the number of sheets stored in a memory circuit (number of sheets for record start) 32 while considering the number of output volumes stored in a memory circuit (addressee, number of received sheets, and number of output volumes) 36 (step S192). If YES in step S192, the number of received sheets is recorded during steps from step S98. If NO in step S192, the flow returns to steps from step S68 to wait until reception is selected.

As described above, in the facsimile apparatus of this embodiment, recording can be performed while considering the number of output volumes.

Fifth Embodiment

A facsimile apparatus of the fifth embodiment will be described below. The facsimile apparatus of the fifth embodiment has a means for receiving a designation of an addressee from a sender station side. When the number of sheets of received information is to be recorded at once, recording is basically performed in the reception order. At this time, if pieces of received information for the same designated addressee are stored in a memory circuit 24, the reception order is ignored, and the pieces of received information for the same designated addressee are preferentially recorded, thereby recording information for each addressee.

Figure 9:
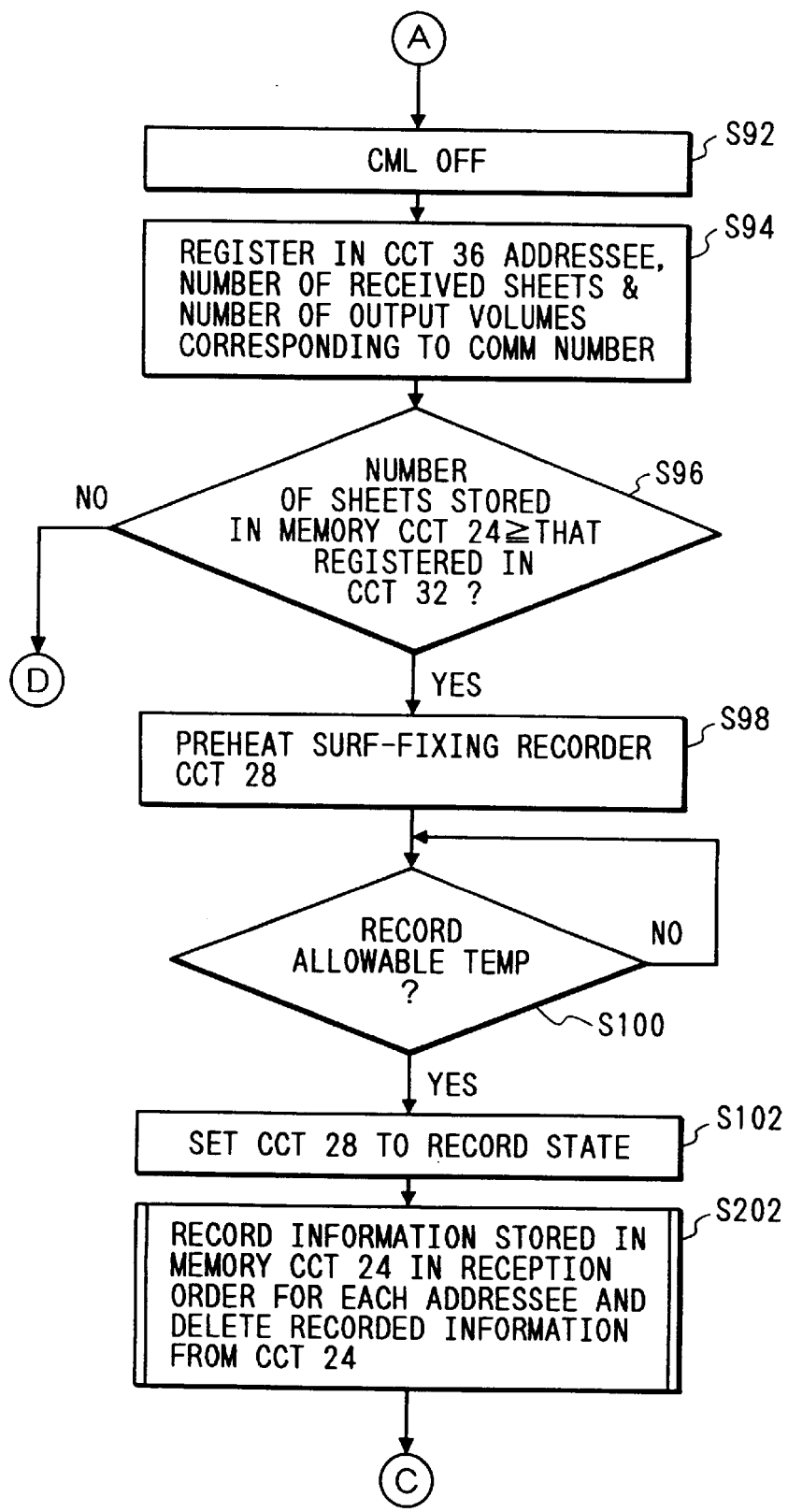
FIG. 9 is a flow chart showing part of a facsimile transmission/reception control routine of the fifth embodiment.

FIG. 9 is a flow chart showing part of a facsimile transmission/reception control routine of the fifth embodiment. This routine is achieved by replacing step S104 of the first embodiment with step S202. The same step numbers as those of the first embodiment represent the same control, and a detailed description thereof will be omitted.

A controller 50 records received information stored in the memory circuit 24 in the reception order for each addressee stored in a memory circuit (addressee, number of received sheets, and number of output volumes) 36 (step S202). At this time, the recorded information is deleted from the memory circuit 24. As described above, the facsimile apparatus of this embodiment can record information for each addressee.

Sixth Embodiment

A facsimile apparatus of the sixth embodiment will be described below. In the facsimile apparatus of the sixth embodiment, if received information exceeding the number of sheets is not stored in a memory circuit 24 after the elapse of a predetermined time period from completion of recording, the received information stored in the memory circuit 24 so far is forcibly recorded.

Figure 10:
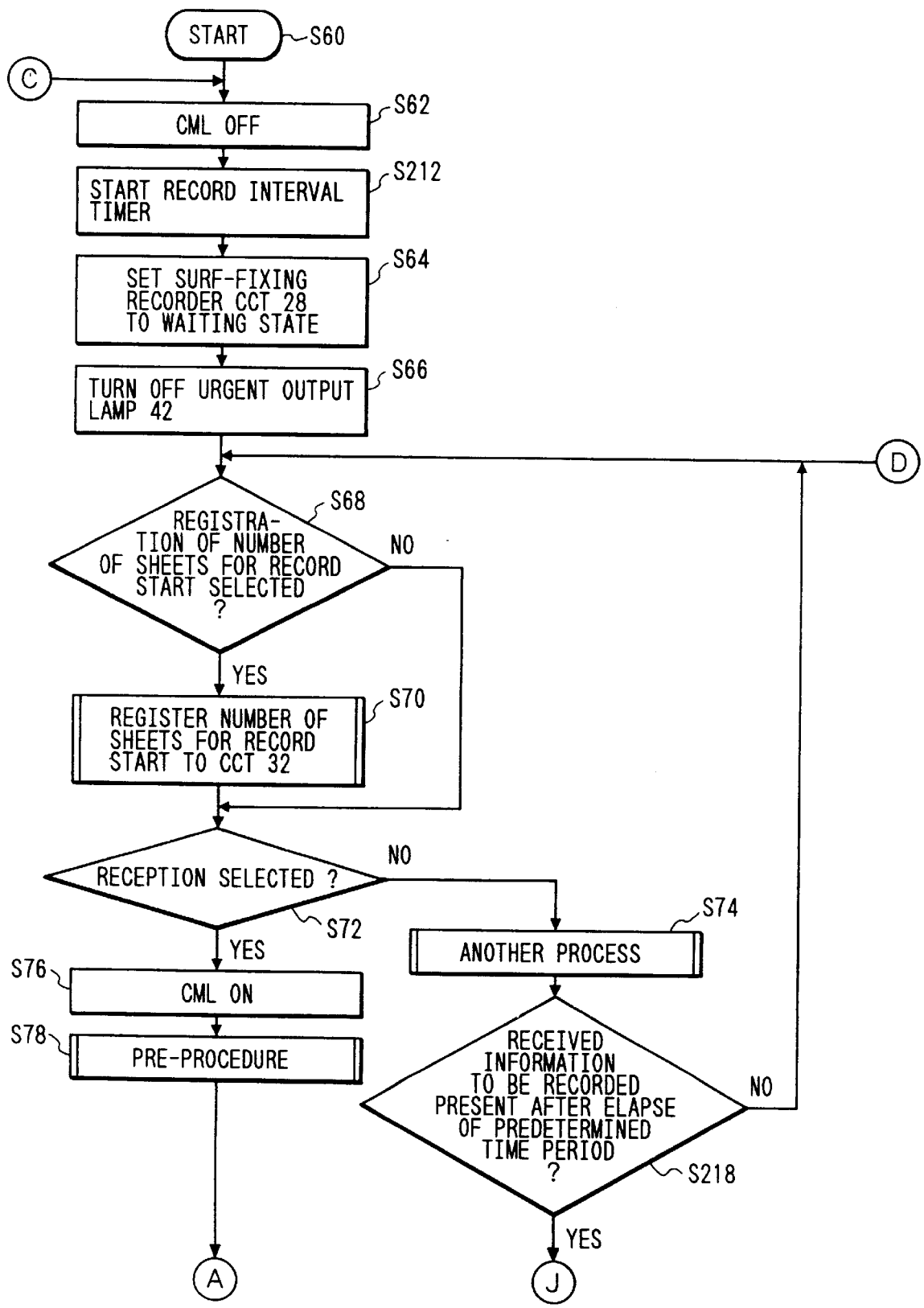
FIG. 10 is a flow chart showing part of a facsimile transmission/reception control routine of the sixth embodiment.

FIG. 10 is a flow chart showing part of a facsimile transmission/reception control routine of the sixth embodiment. In the description of the sixth embodiment, the same step numbers as those of the first embodiment represent the same control, and a detailed description thereof will be omitted. A controller 50 starts an incorporated timer to measure a time period from completion of recording (step S212).

The controller 50 determines whether received information to be recorded is present in the memory circuit 24 after the elapse of a predetermined time period (e.g., 60 minutes) counted by a record interval timer (step S218). If YES in step S218, the flow advances to steps from step S98 to record the information before the information exceeds the number of sheets. If NO in step S218, the flow returns to steps from step S68 to wait until reception is selected.

As described above, the facsimile apparatus of this embodiment can perform recording after the elapse of a predetermined time period before the received information exceeds the number of sheets.

Seventh Embodiment

An apparatus of the seventh embodiment will be described below. The facsimile apparatus of the seventh embodiment has a function (compulsory output button 38) of forcibly recording received information stored in a memory circuit 24. When this function is selected, all the received information stored in the memory circuit 24 is forcibly recorded.

Figure 11:
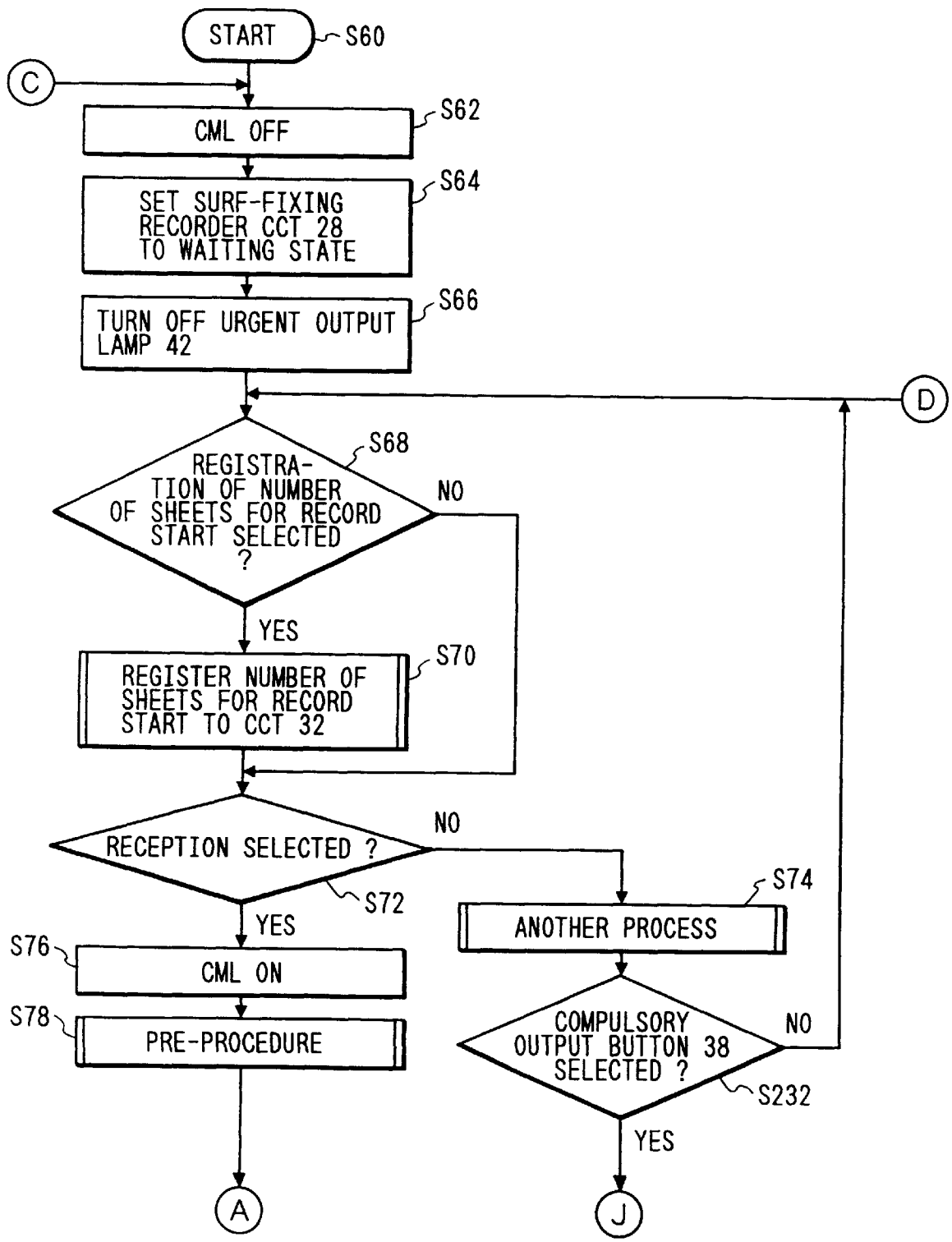
FIG. 11 is a flow chart showing part of a facsimile transmission/reception control routine of the seventh embodiment.

FIG. 11 is a flow chart showing part of a facsimile transmission/reception control routine of the seventh embodiment. In the seventh embodiment, the same step numbers as those of the first embodiment represent the same control, and a detailed description thereof will be omitted. A controller 50 receives a signal on a signal line 38a to determine whether the compulsory output button 38 is selected (step S232). If YES in step S232, the flow advances to steps from step S98 to forcibly output the received information stored in the memory circuit 24.

If NO in step S232, the flow advances to steps from step S68 to wait until reception is selected. As described above, the facsimile apparatus of this embodiment can forcibly record the received information before the information exceeds the number of sheets.

Eighth Embodiment

A facsimile apparatus of the eighth embodiment will be described below. The facsimile apparatus of the eighth embodiment has a means (urgent output button 40) for designating urgent output of received information on a receiver station side from a sender station side. When urgent output is selected, the facsimile apparatus on the receiver station side is informed of it by a protocol signal. The facsimile apparatus on the receiver station side immediately outputs the received information with the urgent output designation, and at the same time, records all the received information stored in a memory circuit 24 during recording of the received information. In recording, the facsimile apparatus on the receiver station side preferentially records the received information with the urgent output designation.

Figure 12:
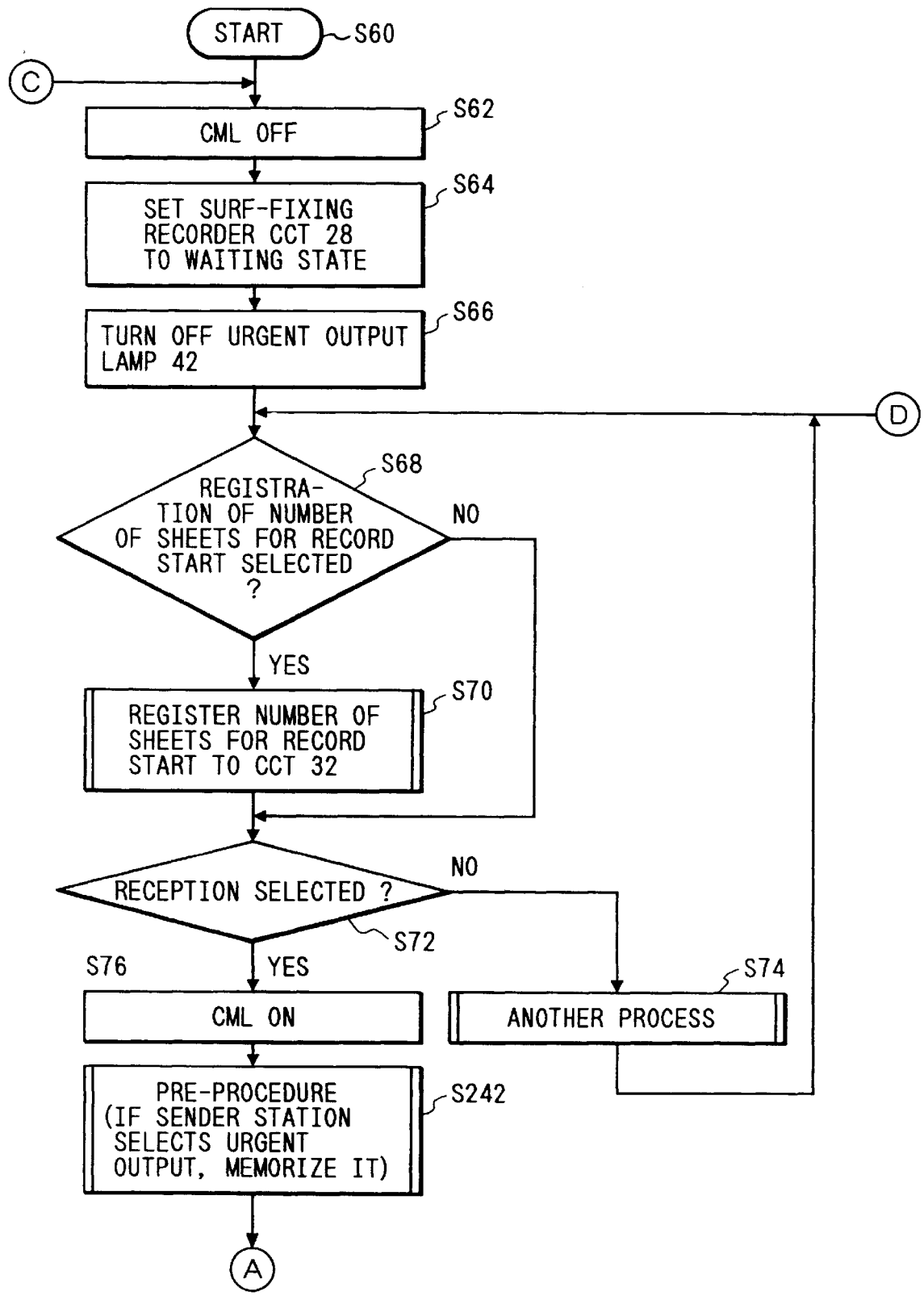
FIG. 12 is a flow chart showing part of a facsimile transmission/reception control routine of the eighth embodiment.
Figure 13:
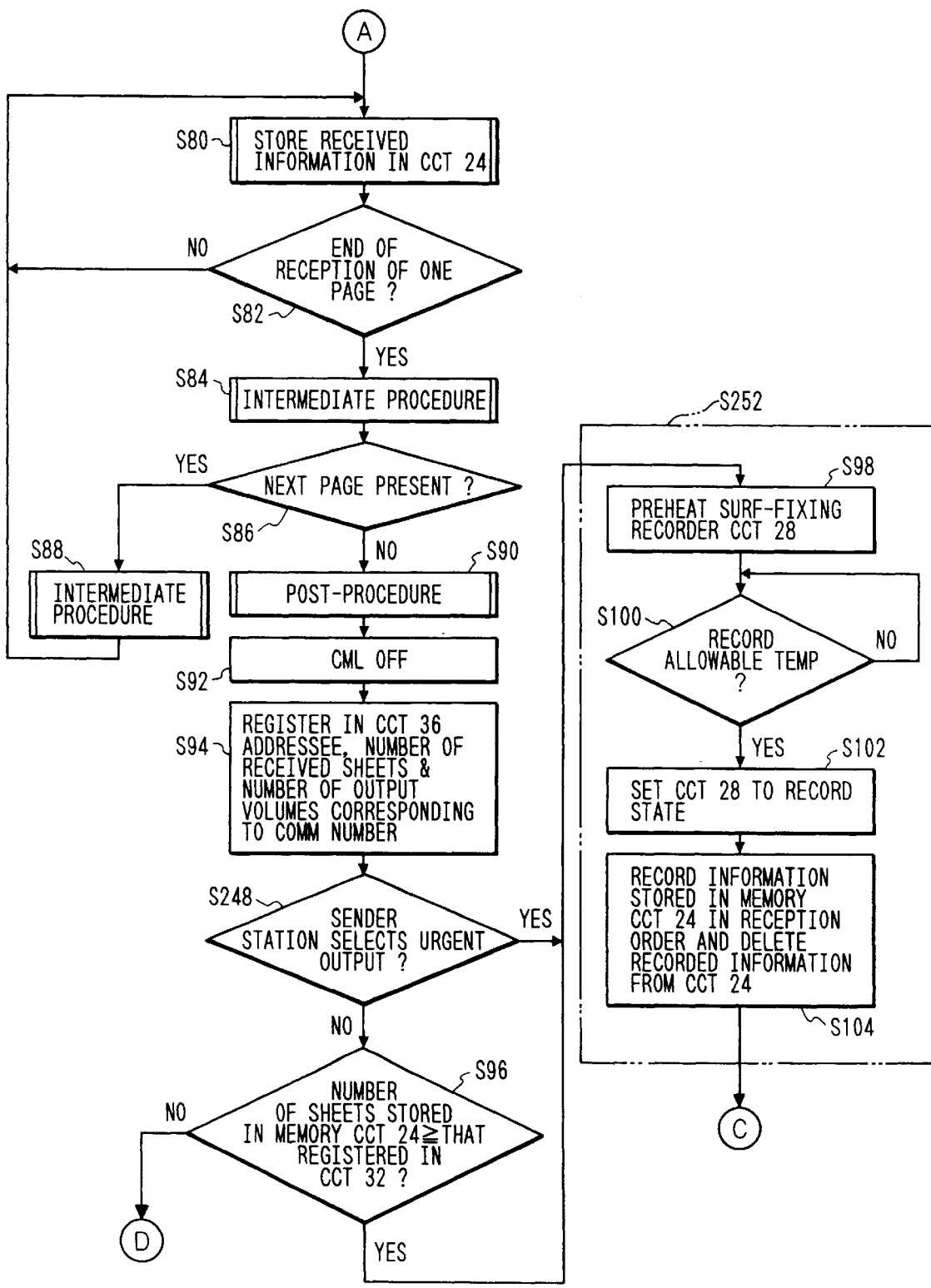
FIG. 13 is a flow chart showing part of the facsimile transmission/reception control routine subsequent to FIG. 12.

FIGS. 12 and 13 are flow charts showing part of a facsimile transmission/reception control routine of the eighth embodiment. This routine is realized by replacing step S78 of the first embodiment with step S242, and steps S96 to S104 of the first embodiment with steps S248 and S252. The same step numbers as those of the first embodiment represent the same control, and a detailed description thereof will be omitted.

At the start of reception, a controller 50 executes a pre-procedure (step S242). At this time, if the facsimile apparatus on the sender station side selects urgent output, and a command for urgent output is received, it is memorized.

Upon completion of reception, the controller 50 determines whether the facsimile apparatus on the sender station side selects urgent output, and the command for urgent output is received (step S248). If YES in step S248, processes in steps from step S98 are executed to preferentially record the received information with the urgent output designation (step S252). If NO in step S248, the flow advances to steps from step S96. As described above, the facsimile apparatus of this embodiment can perform recording in accordance with a command for urgent output from the facsimile apparatus on the sender station side.

Ninth Embodiment

Figure 14:
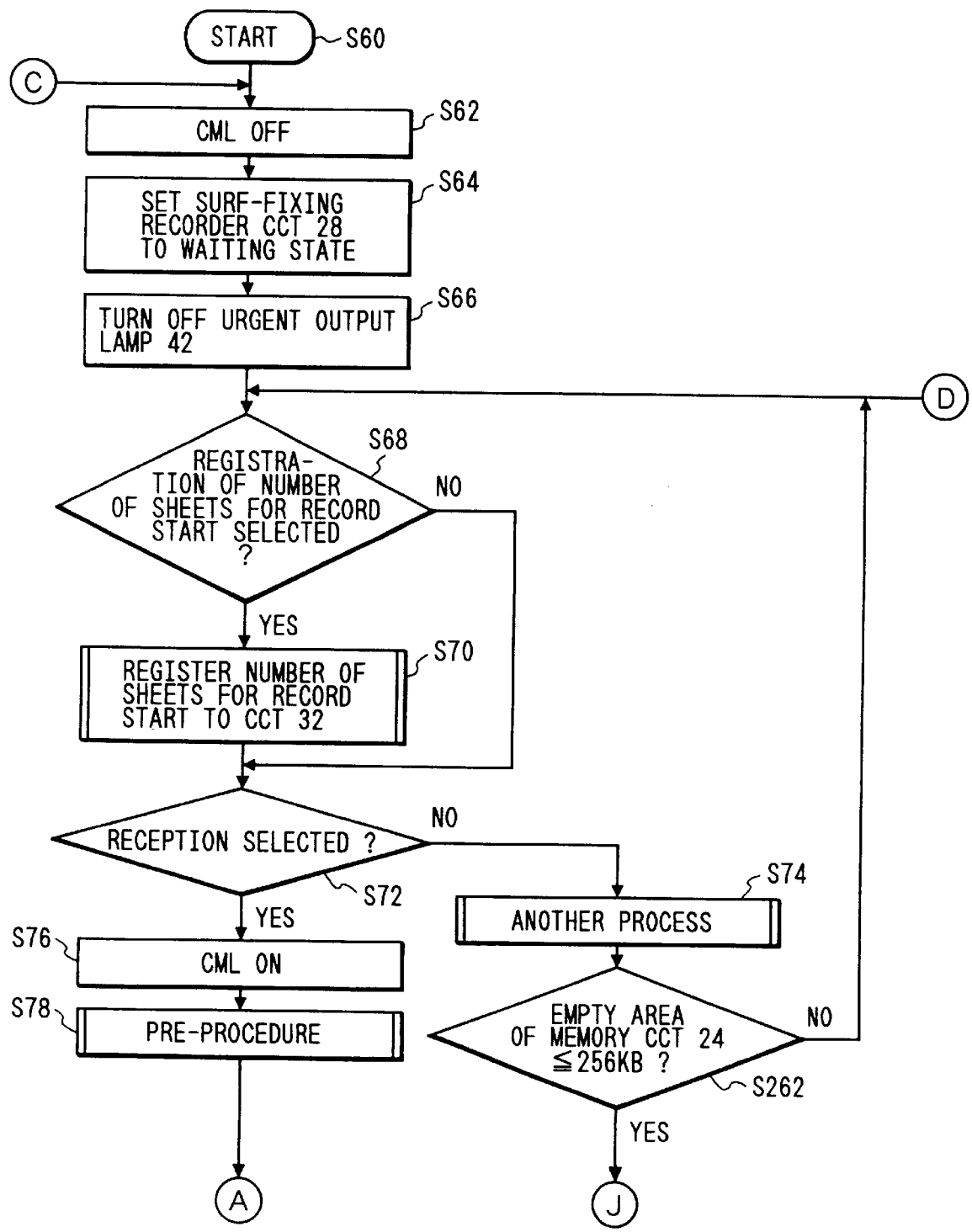
FIG. 14 is a flow chart showing part of a facsimile transmission/reception control routine of the ninth embodiment.

A facsimile apparatus of the ninth embodiment will be described below. In the facsimile apparatus of the ninth embodiment, if the empty area of a memory circuit 24 becomes smaller before the number of recorded sheets exceeds the number of sheets, all received information stored in the memory circuit 24 is recorded. FIG. 14 is a flow chart showing part of a facsimile transmission/reception control routine of the ninth embodiment. The same step numbers as those of the first embodiment represent the same control, and a detailed description thereof will be omitted. A controller 50 receives a signal on a signal line 24b from the memory circuit 24 to determine whether the empty area of the memory circuit 24 is smaller than 256 kbits (step S262). If YES in step S262, processes in steps from step S98 are executed to record received information stored in the memory circuit 24.

If NO in step S262, the flow returns to steps from step S68 to wait until reception is selected.

As described above, the facsimile apparatus of this embodiment can perform recording when the empty area of the memory circuit 24 becomes smaller.

10th Embodiment

A facsimile apparatus of the 10th embodiment will be described below. The facsimile apparatus of the 10th embodiment can be applied in the first to sixth embodiments and has an ambient light intensity detector circuit 44. More specifically, since no operator recognizes any image while it is dark, information stored in a memory circuit 24 is not recorded.

Figure 15:
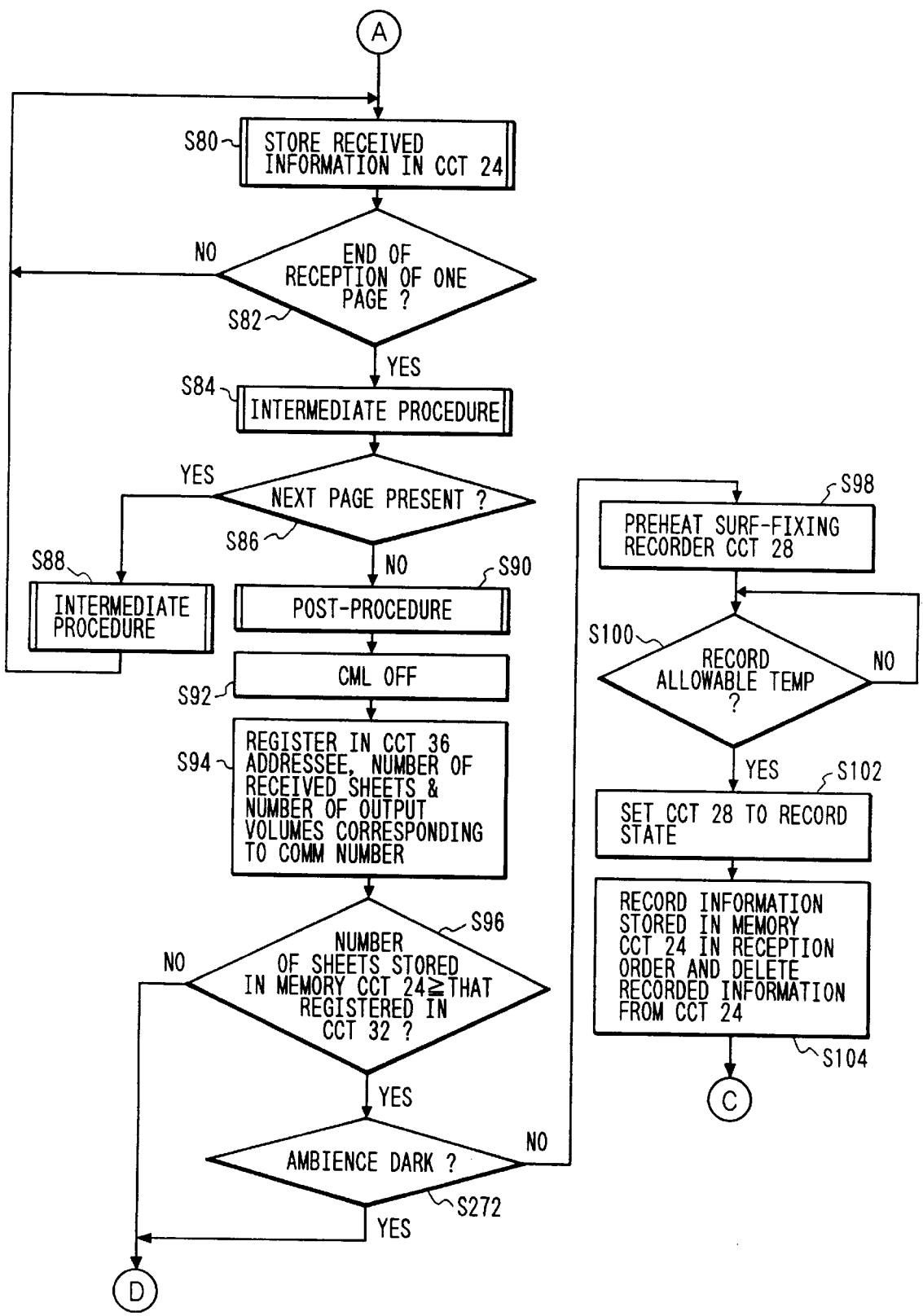
FIG. 15 is a flow chart showing part of a facsimile transmission/reception control routine of the 10th embodiment.

FIG. 15 is a flow chart showing part of a facsimile transmission/reception control routine of the 10th embodiment. The same step numbers as those of the first embodiment represent the same control, and a detailed description thereof will be omitted. A controller 50 receives a signal on a signal line 44a from the ambient light intensity detector circuit 44 to determine whether it is dark (step S272). If YES in step S272, it is determined that nobody is present in the ambience, and processes in steps from step S68 are executed to wait until reception is selected. If NO in step S272, it is determined that anybody is present in the ambience, and processes in steps from step S98 are executed to perform recording. As described above, the facsimile apparatus of this embodiment performs recording while determining the ambient light intensity.

11th Embodiment

A facsimile apparatus of the 11th embodiment will be described below. The facsimile apparatus of the 11th embodiment has a room temperature detector circuit 46 for detecting an ambient temperature while the facsimile apparatus of the 10th embodiment detects the ambient light intensity. More specifically, if the room temperature is high, it is determined that anybody is present in the ambience. If the room temperature is low, it is determined that nobody is present in the ambience. In a facsimile transmission/reception control routine at this time, a room temperature can be determined in step S272 of the 11th embodiment.

12th Embodiment

Figure 16:
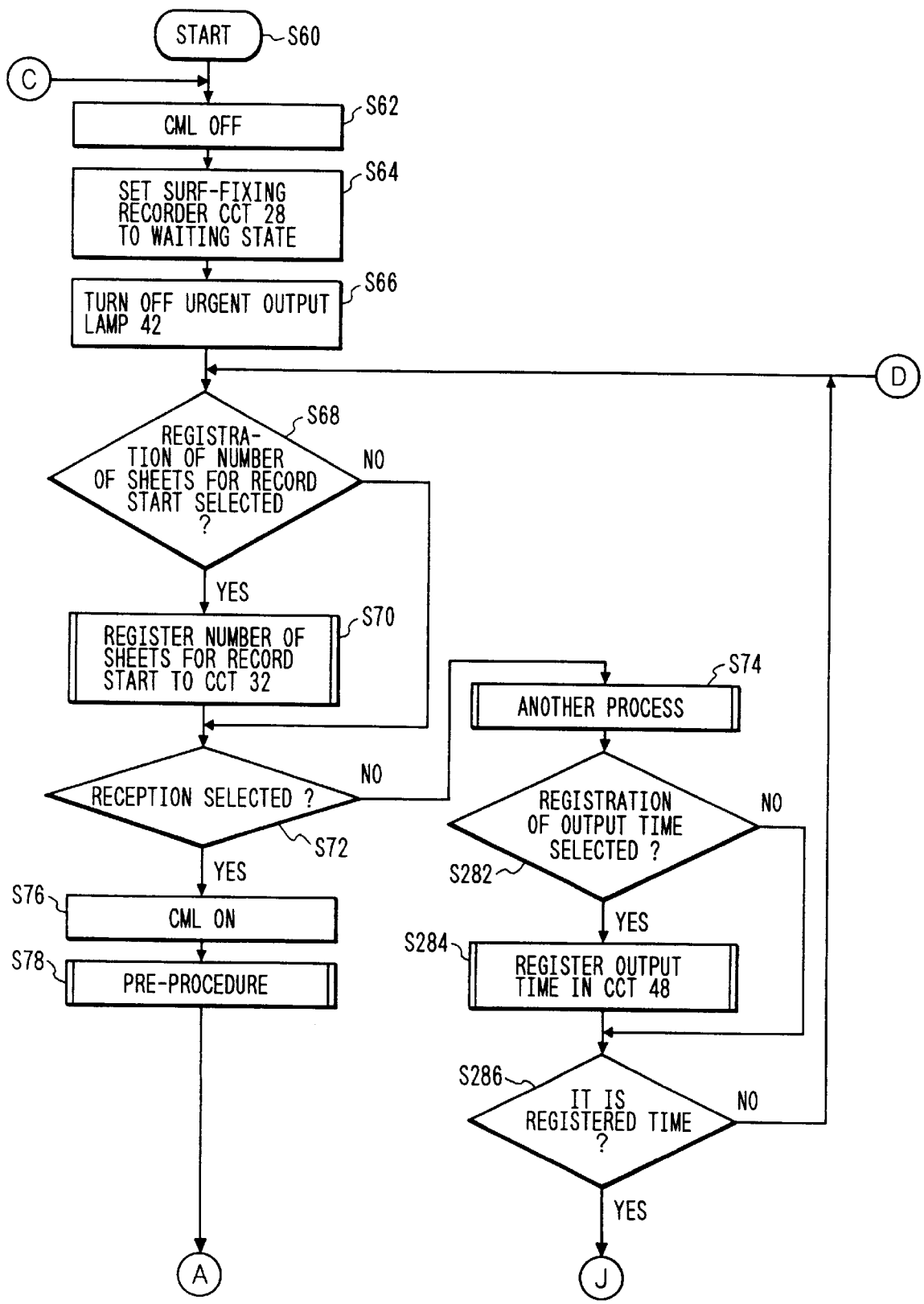
FIG. 16 is a flow chart showing part of a facsimile transmission/reception control routine of the 12th embodiment.

A facsimile apparatus of the 12th embodiment will be described below. In the facsimile apparatus of the 12th embodiment, a plurality of times for outputting received information are registered. When it is the registered time, all the received information stored in a memory circuit 24 so far is output. FIG. 16 is a flow chart showing part of a facsimile transmission/reception control routine of the 12th embodiment. The same step numbers as those of the first embodiment represent the same control, and a detailed description thereof will be omitted. A controller 50 determines whether registration of an output time is selected (step S282). If YES in step S282, the output time is registered in an output time registration circuit 48 (step S284). If NO in step S282, the flow advances to step S286.

In step S286, a signal is received from the output time registration circuit 48 to determine whether it is the registered time for outputting the received information (step S286). If YES in step S286, processes in steps from step S98 are executed to perform recording. If NO in step S286, the flow returns to step S68 to wait until reception is selected.

As described above, in this routine, recording can be performed at the registered time.

As has been described above, according to the facsimile apparatus of the present invention, preheat for recording is performed once, and information exceeding the number of sheets is recorded at once, thereby saving power.

What is claimed is:

1. A communication apparatus, comprising:

receiving means for receiving a plurality of classifiable data;

discriminating means for discriminating classification information concerning each of the plurality of classifiable data, wherein said classification information is a sub-address stored in a corresponding manner to each of the classifiable data when the classifiable data is received;

storing means for storing the plurality of classifiable data; and output means for outputting the plurality of classifiable data classified in a format according to the respective classification information discriminated by said discriminating means.

2. A communication apparatus according to claim 1, wherein said output means is a printer.

3. A communication method, comprising the steps of:

causing to receive a plurality of classifiable data;

causing to discriminate classification information concerning each of the plurality of classifiable data, wherein said classification information is a sub-address stored in a corresponding manner to each of the classifiable data when the classifiable data is received;

causing to store the plurality of classifiable data; and causing to output the plurality of classifiable data classified in a format according to the respective classification information discriminated by said discriminating step.

4. A communication method according to claim 3, wherein said causing to output step includes a printing step.

* * * * *

UNITED STATES PATENT AND TRADEMARK OFFICE
CERTIFICATE OF CORRECTION

PATENT NO. : 6,028,678

DATED : February 22, 2000

INVENTOR(S) : TAKEHIRO YOSHIDA

It is certified that error appears in the above-identified patent and that said Letters Patent is hereby corrected as shown below:

<u>SHEET 2</u>

Figure 1B, "SURF- FIXING" should read --SURF-FIXING--.

<u>SHEET 17</u>

Figure 16, "IT IS REGISTERED TIME?" should read
--IS IT REGISTERED TIME?--.

<u>COLUMN 5</u>

Line 19, "in" should read --for--.
Line 60, "to record" should read --the recording of-.

Signed and Sealed this

Twentieth Day of February, 2001

Attest:

NICHOLAS P. GODICI

Attesting Officer     Acting Director of the United States Patent and Trademark Office